United States Patent
Croce et al.

4,043,653
Aug. 23, 1977

[54] HOLOGRAPHIC HIGH RESOLUTION CONTACT PRINTER

[75] Inventors: Richard F. Croce, El Granada, Calif.; Gardner T. Burton, Danvers, Mass.

[73] Assignee: The United States of America as represented by the Secretary of the Air Force, Washington, D.C.

[21] Appl. No.: 647,528

[22] Filed: Jan. 8, 1976

[51] Int. Cl.² ............... G03B 27/02; G03B 27/32
[52] U.S. Cl. .................................. 355/2; 350/3.5; 355/80; 355/101
[58] Field of Search ............... 355/2, 79, 80, 101, 355/71; 350/3.5

[56] References Cited

U.S. PATENT DOCUMENTS 3,572,879   3/1971   Nassenstein ............... 355/2 X

OTHER PUBLICATIONS

IBM Technical Disclosure Bulletin, "Hologram Replication", J. A. McDonnell, vol. 11, No. 1, June 1968, p. 15.

Fujitsu Scientific & Technical Journal, "Copied Phase Hologram of Photoresist," Nakajima et al, vol. 6, No. 3, Sept. 1970, p. 73, Fig. 3.

*Primary Examiner*—Richard A. Wintercorn
*Attorney, Agent, or Firm*—Joseph E. Rusz; Arsen Tashjian

[57] ABSTRACT

A holograph high resolution contact printer for use in transferring high resolution information, which is in the form of a pattern on a transparency, from the transparency to the light-sensitive photoresist material front surface of a light-recording medium having a light insensitive substrate rear surface, in which the light-sensitive photoresist surface previously has been exposed to a preselected diffraction grating, but the recording medium has not been developed. The contact printing apparatus, in its most basic and generic preferred embodiment, includes: a light emitting source, in which the emitted light need not be coherent; a light-impervious member, disposed forward of the emitted light, having a circular aperture through which passes a portion of the emitted light; a double convex lens forward of, and in optical alignment with, the aperture of the light-impervious member, with the passed portion of the emitted light impinging upon the lens; a selectively rotatable diffuser, positioned forward of and in optical alignment with the lens, with light transmitted by the lens impinging upon the rotating diffuser and, in turn, being transmitted by the diffuser; and, appropriate component(s), forward of and in optical alignment with the diffuser, for holding and supporting the transparency and the light-sensitive recircling medium in abutting contact, with the accomplishment of the desired result of transferring the information pattern that is on the transparency to the light-sensitive recording medium, when the diffused light impinges upon, and is transmitted through, the transparency. After development of the recording medium, a relief forms on the photoresist. This relief records, in the depth of the material etched away, the high resolution now stored in and on the recording medium. Unlike the prior art, this contact printer permits the storage, the display, and the duplication of high resolution information on frames as large as 9-inches by 9-inches, or in the format of 9-inch continuous web data.

6 Claims, 6 Drawing Figures

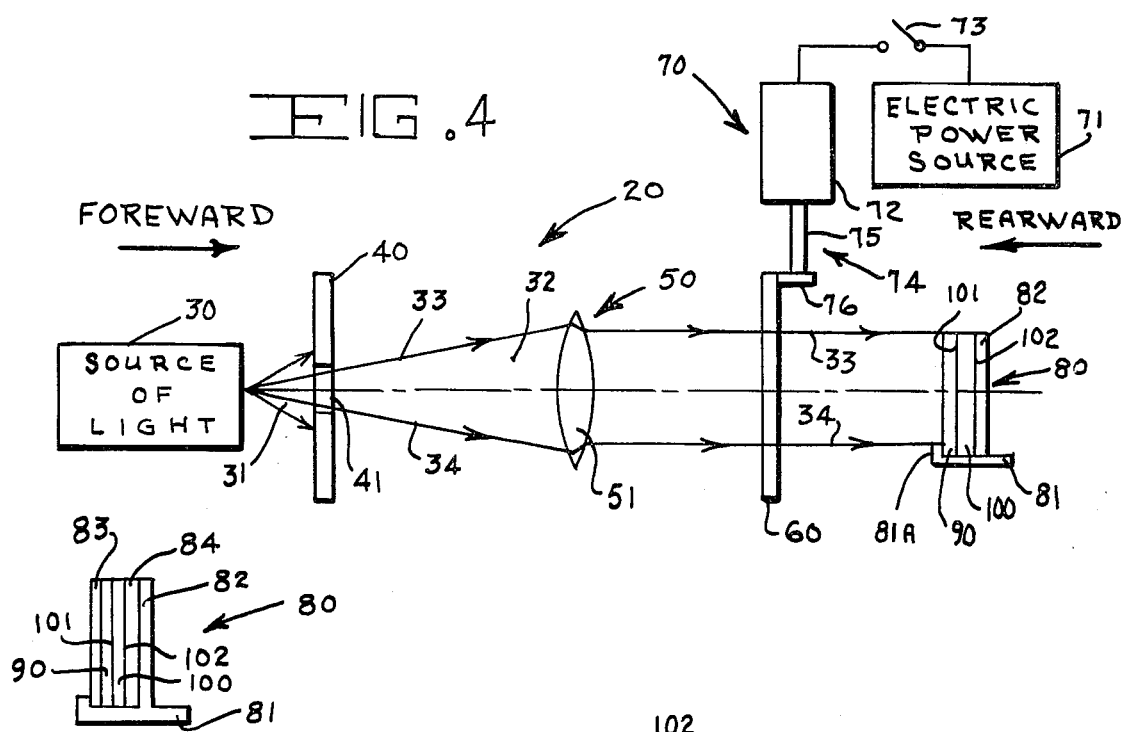
FIG. 4
FIG. 5
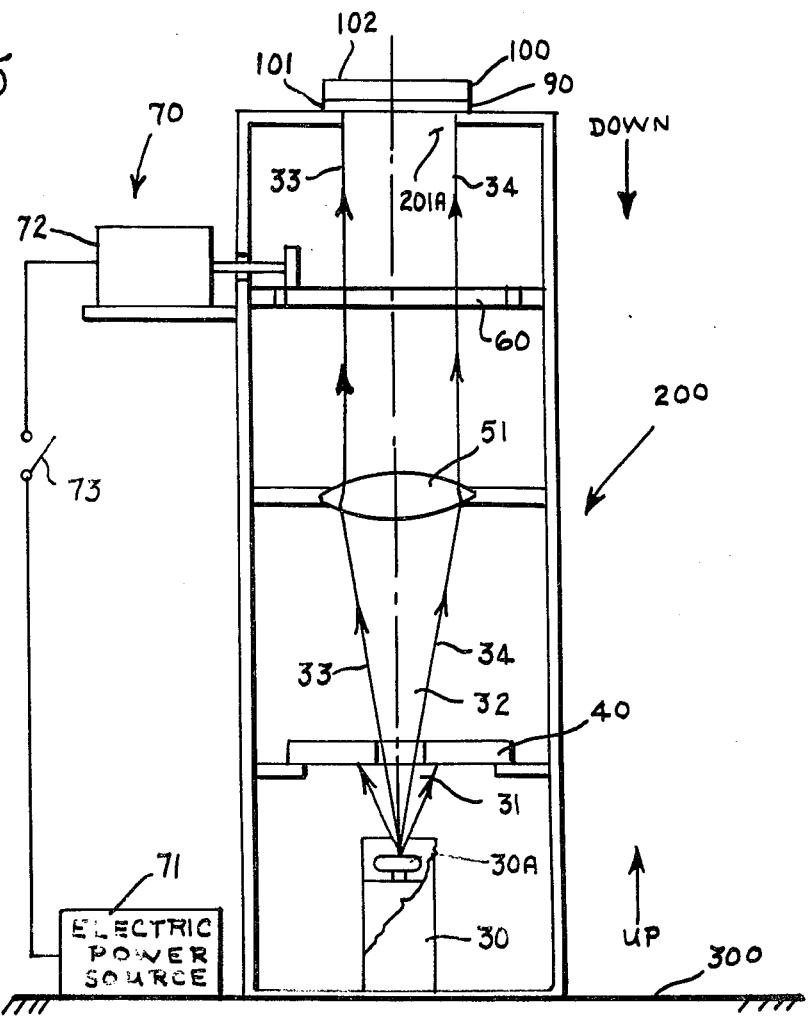
FIG. 6

HOLOGRAPHIC HIGH RESOLUTION CONTACT PRINTER

STATEMENT OF GOVERNMENT INTEREST

The invention described herein may be manufactured and used by or for the Government for governmental purposes without the payment of any royalty thereon.

BACKGROUND OF THE INVENTION

This invention relates generally to the storage of high resolution information by, and with, the use of holography; and, more particularly, to a unique contact printer which is useable in producing a high resolution hologram in which the high resolution information is stored.

High resolution information may be stored by a method which essentially comprises three steps. The first of these steps is exposing a preselected diffraction grating (such as by interferring two plane wavefronts derived from a common coherent source, e.g., a laser, or by using a Roche ruled grating in a doubling self-image process) on the light-sensitive front surface of a suitable photoresist material, such as one deposited to a depth of 3 or 4 micrometers on a stable substrate (e.g., glass, or "Mylar"), thereby forming and preserving the recorded diffracting grating as a latent image which is stored in the solubility of the exposed photoresist surface material of the recording medium. The next step is exposing the same light-sensitive front surface of the photoresist to the high resolution information that is to be stored thereon and therein. This second exposure may be accomplished by an imaging process, wherein an incoherent light source and lens system are used, to transfer the image of the information to be stored (e.g., a pictorial scene, or other pattern, on a transparency) to the same light-sensitive front surface of the previously exposed, but still not developed, photoresist. The last of the steps is developing the photoresist by conventional methods. This developing causes a relief to be formed on the front surface of the photoresist material. This relief records, in the depth of the photoresist material etched away, the information imaged (and now stored) on the front surface of the photoresist.

It is here to be noted, and to be remembered, that the light-sensitive front surface of the photoresist was double-exposed. Therefore, upon development of the photoresist, mixing of the information (from the original diffraction grating exposure, and also from the later transparency image exposure) results in a combined (i.e., a composite second diffraction grating having a frequency determined by the exposures, but with an efficiency that is spatially modulated in accordance with the stored information.

However, if (as is presently the situation in the art) the information is for use in a volume production duplication system that is to be capable of storing, and of rapidly and inexpensively duplicating and displaying 9-inch by 9-inch data frames (or, more importantly, 9-inch continuous web data format), and if the second exposure is accomplished by a lens imaging system (as discussed above), then the imaging lens which is required is one that is capable of preserving 300 line pairs per millimeter over the 9-inch by 9-inch format. This implies a lens system capable of carrying $9.68 \times 10^4$ line pairs across the diagonal. Although a low $f$/number lens operating in the blue region of the optical spectrum is theoretically capable of imaging the required number of line pairs in a 1:1 imaging system, practical considerations associated with the assembly of such a lens result in the conclusion that the resolving capability of finite conjugate imagery systems limit the information transmission characteristics of the lens to a total of approximately 40,000 line pairs, or a format of approximately 4-inches by 4-inches. Therefore, there is a genuine and current need for a lensless system to eliminate this constraint.

We have invented such a lensless system, which said system is structurally incorporated as a constituent of my unique contact printer. Thereby, we have significantly advanced the state-of-the-art.

SUMMARY OF THE INVENTION

The invention comprises a unique holographic high resolution contact printer for use with a previously exposed, but undeveloped, light-sensitive recording medium, and with a transparency having a pattern thereon.

Therefore, an object of this invention is to teach the structure of such a contact printer.

Another object of this invention is to teach the structure of a preferred embodiment of the inventive contact printer, and variations of said embodiment.

Still another object is to provide apparatus for transmitting image information to a light-sensitive recording medium, such as photoresist, for storing, displaying, and duplicating said image information on 9-inch by 9-inch data frames, or in a 9-inch continuous web data format.

These objects, as well as other related and equally important objects, of this invention will become readily apparent after a consideration of the description of our invention, coupled with reference to the Figures of the drawings.

DESCRIPTION OF THE DRAWINGS

FIG. 4 is a side elevation view, in simplified schematic form, of a preferred embodiment of the inventive holograph high resolution contact printer in its most basic and generic form;

FIG. 5 is a side elevation view, also in simplified schematic form, of a variation of a major component of the preferred embodiment shown in FIG. 4; and FIG. 6 is a side elevation view, also in simplified schematic form, in cross section and partially fragmented, of another variation of the preferred embodiment shown in FIG. 4, as adapted for use in a vertical position.

DESCRIPTION OF THE PREFERRED EMBODIMENT

Preliminary Matters

As used herein, the term "light" is not intended to mean radiation limited to that which is in the visible spectrum, i.e., visible light.

Additionally, the phrases "optically aligned," "in optical alignment," or the like, are intended to mean that the optical or other components referred to are in line with each other in the sense that they are in the path of the beam of light, or portion thereof, which is being emitted, reflected, refracted, diffracted, diffused, transmitted, or the like. Stated another way, the components referred to may be, but need not be, in geometric alignment.

Figure 1:
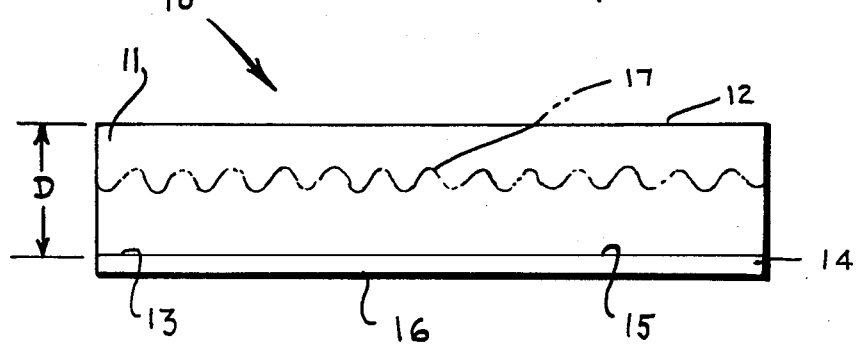
FIGS. 1-3 depict, in longitudinal cross section and in simplified schematic form, a light-sensitive recording medium during a first exposure, and during a second exposure, and after development.

With reference to the "Background of the Invention" herein, FIG. 1 is a simplified schematic representation, in longitudinal cross section of the light sensitive recording medium 10 referred to therein. Said medium 10 comprises a photoresist 11 having a front surface 12 and a back surface 13, and a substrate or backing 14 having a front surface 15 and a back surface 16. Of course, the substrate or backing 14 is made of material which is not affected by the exposure to recording radiation or development of the photoresist 11.

Before exposing the front surface 11 of the light-sensitive recording medium 10 to the preselected grating, the medium 10 is blank. After the exposure, but before development of the photoresist 11, the image of the preselected diffraction grating (the profile of which is shown in phantom, and is generally designated 17) is recorded and stored in photo-resist 11.

Figure 2:
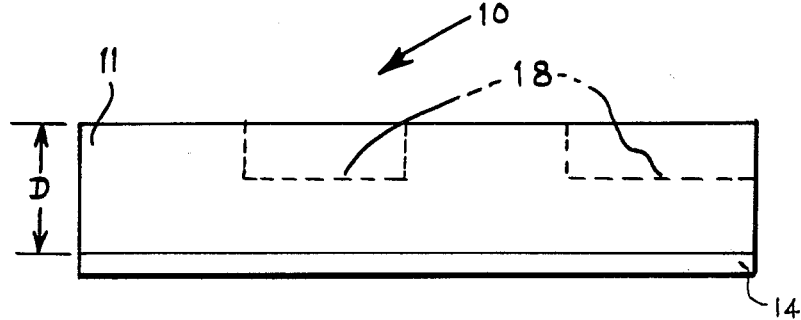

Still with reference to said "Background," FIG. 2 similarly is a simplified schematic representation, in longitudinal cross section of the light-sensitive recording medium 10, after the front surface 12 of the photoresist 11 has been exposed to the high resolution information (such as a pattern on a transparency) that is to be stored in the photoresist 11. In the interest of maintaining simplicity of the drawing, the profile of the latent image of the preselected diffraction grating 17 has been omitted. However, shown is the profile of the latent image of the high resolution information (from the transparency), in phantom and generally designated 18, as if it 18 were, in fact, the sole latent image profile in the photoresist 11.

Figure 3:
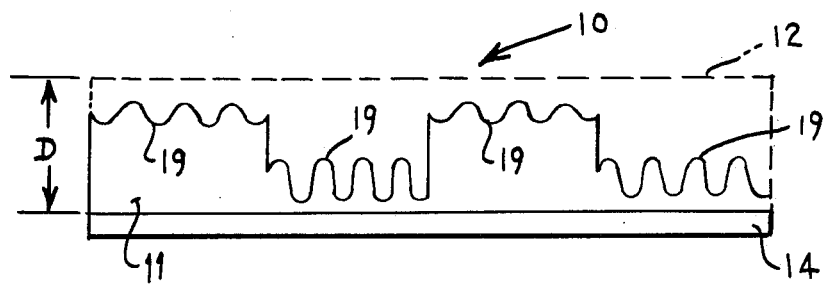

Yet still with reference to said "Background," FIG. 3 is also a simplified schematic representation, in longitudinal cross section of the light-sensitive recording medium 10. However, in this Figure is shown the photoresist profile, generally designated 19, at various points along its profile length, after the photoresist 11, or more accurately the entire recording medium 10, is subjected to development. The profile 19 is a composite, resulting from the two-step exposure of the photoresist 11. However, it is here noted and emphasized that the depth of profile 18 below front surface 12 of photoresist 11 is not a linear function of the additive or subtractive depths (below front surface 12 of photoresist 11) of diffracting grating latent image profile 17, FIG. 1, and transparency pattern latent image profile 18, FIG. 2.

Now, with reference to FIG. 4, therein is shown a preferred embodiment 20 of our inventive holographic high resolution contact printer in its most basic and generic form. It is to be remembered that our inventive contact printer 20 is an adaptation for use with: (a) a previously exposed, but undeveloped, light-sensitive recording medium of the photoresist type, such as discussed herein in the "Background" and as shown in FIG. 1; and, (b) a transparency having a pattern thereon, with said pattern constitutes the high resolution information that is to be stored on and in the previously exposed, but undeveloped, photoresist. Additionally, with reference to FIG. 4, the directional designations "Forward" and "Rearward" together with their corresponding arrows, are shown in order to better orient the reader. It is to be understood that the term "Forward" is intended to be synonymous and interchangeable with the term "Front"; and, that the term "Rearward" is intended to be synonymous and interchangeable with the term "Back."

With reference to FIG. 4, our preferred embodiment 20 includes: a source of light 30 emitting a beam of light 31; a light impervious member 40 having a circular aperture 41, with member 40 so disposed forward of the light source 30 that the light beam 31 impinges upon it 40, and a portion 32 of the beam 31 enters into and passes through the aperture 41; means 50 for collimating and transmitting impinging light, disposed forward of, and in optical alignment with, the aperture 41, so that transmitted light beam 32 (with edge rays 33 and 34) which passes through aperture 41 impinges upon this means 50; a rotatable light diffuser 60 disposed forward of, and in optical alignment with, the impinging light collimating and transmitting means 50, for diffusing and transmitting light beam 32; means 70 for selectively rotating the rotatable diffuser 60; and, means 80 for removably holding and supporting the transparency 90 having the information pattern thereon, and the previously exposed, but undeveloped, photoresist 100 in abutting contact, with the holding and supporting means 80 (and, of course, the transparency 90 and the photoresist 100) disposed forward of, and in optical alignment with, the rotatable light diffuser.

As previously discussed, the photoresist 100 has a light-sensitive front surface 101, and a substrate rear surface 102 that is not affected by the radiation, i.e., light beam 32. Accordingly, as seen in FIG. 4, the photoresist 100 is positioned forward of (i.e., behind) the transparency 90, with the light-sensitive front surface 101 facing, and abutting, with the transparency 90, with both light-sensitive surface 101 and the transparency 90 facing toward the emitted light beam 31.

The light source 30 may (but need not) include a mercury arc lamp, not shown in FIG. 4, but which will be shown later. The means 50 for collimating and transmitting (any) impinging light, such as light beam 32, may be a positive lens, such as double convex lens 51. The means 70 for selectively rotating the rotatable diffuser 60 may include: an electric power source 71 connected to an electric motor 72 with a switch 73 interposed therebetween; and, appropriate conventional linkage 74 (such as a shaft 75, and a transversely mounted friction type member 76 abutting diffuser 60) to impart rotational (i.e., circular) motion selectively to the light diffuser 60. The transparency 90 and photoresist 100 holding and supporting means 80 may include a horizontal member 81 or base (having a flange 81A at the forward end) upon which a vertical member 82 or retainer plate is slidably movable and may be releasably locked to member 81.

With reference to FIG. 5, therein is shown a variation of the holding and supporting means 80, previously shown in FIG. 3. As is shown in FIG. 4, said means 80 may include, in addition to the retainer plate 82 and the base 81: a glass plate 83 disposed rearward of, and in abutting contact with, the transparency 90; a rubber member 84 disposed forward of, and in abutting contact with the exposed, but undeveloped, photoresist 100, and simultaneously disposed rearward of, and in abutting contact with, the retainer plate 82. The purpose of the glass plate 83 and of the rubber member 84 is to ensure that the transparency 90 is supported, held and maintained in a flat condition.

With reference to FIG. 6, therein is shown another variation of the preferred embodiment 20 shown in FIG. 4. This variation 200 is intended as an adaptation for use in a vertical position on a stable surface 300. In this variation, wherein similar components have the same reference numerals as they have in FIG. 4, the preferred mercury arc lamp 30A is shown, as is a light-impervious housing 201 with an opening 201A at the upper end, whereat the transparency 90 can be laid face-down, with the photoresist 100 thereon (with the light-sensitive front surface face-down), obviating the need for any retainer plate, such as 82, and/or glass plate 83 and rubber member 84 because of the gravitational forces will hold the transparency 90 flat.

MANNER OF OPERATION OF THE PREFERRED EMBODIMENT

The manner of operation of the preferred embodiment 20, FIG. 4 and of the variations FIGS. 5 and 6, of our inventive holographic high resolution contact printer can be ascertained easily by a person of ordinary skill in the art from the foregoing description, coupled with reference to the Figures (particularly 4, 5 and 6) of the drawings.

For others, it is sufficient to say in explanation that when the light from light beam 32, FIG. 4, impinges upon and passes through transparency 90, FIG. 4, the image of the pattern on the transparency is "transferred" to the light-sensitive front surface 101 of the recording medium 100, FIG. 4, resulting in a latent image, such as is shown in FIG. 2. Then, when the double-exposed recording medium is developed, a relief is formed on and in the front surface of the recording medium, such as is shown in FIG. 3. As previously stated, this relief records, in the depth of the material etched away, the information now stored in and on the recording medium.

CONCLUSION

It is abundantly clear from all of the foregoing, and from the Figures of the drawings, that the stated and desired objects, and other related objects, of our invention have been achieved.

It is to be noted that, although there have been described the fundamental and unique features of our invention as applied to a particular preferred embodiment and variations thereof, other embodiments, adaptations, additions, omissions, and the like will occur to, and can be made by, those of ordinary skill in the art, without departing from the spirit of our invention.

What is claimed is:

1. A holographic high resolution contact printer for use with a transparency having a pattern thereon, and with a light-sensitive recording medium of the photoresist type having a light-sensitive front surface and a substrate rear surface, wherein said front surface has been previously exposed to a preselected diffraction grating, and wherein said photoresist has not been developed, and also wherein said transparency and said light-sensitive front surface of said recording medium are in abutting contact, comprising:

a. a source of light, with said source emitting a beam of light;
   b. a light impervious member having a circular aperture, with said light impervious member so disposed forward of said light source that said emitted light beam impinges thereupon, and a portion of said emitted light beam enters into and passes through said aperture;
   c. means for collimating and transmitting impinging light, with said means disposed so that said portion of said emitted light beam which passes through this aperture impinges upon said means;
   d. a rotatable light diffuser disposed forward of, and in optical alignment with, said collimating and transmitting means;
   e. means for selectively rotating said rotatable light diffuser;
   f. and, means, disposed forward of and in optical alignment with said rotatable light diffuser, for removably holding and supporting said transparency and said previously exposed light-sensitive recording medium in abutting contact, with said recording medium disposed forward of said transparency, and with said light-sensitive front surface of said recording medium facing rearwardly.

2. A holographic high resolution contact printer, as set forth in claim 1, wherein said source of light includes a mercury arc lamp.

3. A holographic high resolution contact printer, as set forth in claim 1, wherein said means for collimating and transmitting impinging light is a positive lens.

4. A holographic high resolution contact printer, as set forth in claim 3, wherein said positive lens is a double convex lens.

5. A holographic high resolution contact printer, as set forth in claim 1, wherein said means for removably holding and supportng said transparency and said previously exposed light-sensitive recording medium in abutting contact includes a retainer plate forward of, and in abutting contact with, said rear surface of said recording medium.

6. A holographic high resolution contact printer, as set forth in claim 1, wherein said means for removably holding and supporting said transparency and said previously exposed light-sensitive recording medium in abutting contact includes: a glass plate rearward of and in abutting contact with said transparency; a rubber member disposed forward of and in abutting contact with said rear surface of said recording medium; and, a retainer plate disposed forward of and in abutting contact with said rubber member.

* * * * *